(12) United States Patent
MacDonald et al.

(10) Patent No.: US 7,487,007 B2
(45) Date of Patent: *Feb. 3, 2009

(54) OVERMOLDING SYSTEM

(75) Inventors: Jeffrey Douglas MacDonald, North York (CA); Alireza Mortazavi, Richmond Hill (CA); Robin Alexander Arnott, Alliston (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/550,859

(22) Filed: Oct. 19, 2006

(65) Prior Publication Data
US 2008/0154418 A1    Jun. 26, 2008

(51) Int. Cl.
B29C 45/00    (2006.01)
(52) U.S. Cl. .................. 700/201; 700/197; 700/113
(58) Field of Classification Search .................. 700/112, 700/113, 197, 200, 201; 425/588, 589
See application file for complete search history.

(56) References Cited

U.S. PATENT DOCUMENTS

| | | | |
|---|---|---|---|
| 4,330,257 A | 5/1982 | Rees et al. | |
| 6,143,225 A * | 11/2000 | Domodossola et al. | 264/237 |
| 6,837,697 B2 | 1/2005 | Lees et al. | |
| 6,889,535 B1 * | 5/2005 | Ericson | 72/61 |
| 2003/0077409 A1 * | 4/2003 | Schnell | 428/35.8 |
| 2006/0153947 A1 * | 7/2006 | Shakal et al. | 425/589 |
| 2006/0177540 A1 * | 8/2006 | Lichtinger | 425/589 |

FOREIGN PATENT DOCUMENTS

| | | |
|---|---|---|
| CA | 2241509 C | 1/1999 |
| EP | 826476 | 3/1998 |
| JP | 2004345328 A | 12/2004 |
| WO | 2004011315 | 2/2004 |
| WO | 2004056610 | 7/2004 |

OTHER PUBLICATIONS

Secondary Operations: Unique System Uses Press Motion As Punch and Die, Sep. 1992, p. 10, Plastics World.
ALPHA, Multi-processing Technology, Oct. 1989, Krauss Maffei of Germany.

* cited by examiner

Primary Examiner—Kidest Bahta
Assistant Examiner—Nathan Laughlin

(57) ABSTRACT

Disclosed is (i) an overmolding system, (ii) a method of an overmolding system, (iii) an article of manufacture for directing a data processing system to control a molding system, and (iv) an article manufactured by an overmolding system.

7 Claims, 9 Drawing Sheets

OVERMOLDING SYSTEM

TECHNICAL FIELD

The present invention generally relates to, but is not limited to, molding systems, and more specifically the present invention relates to, but is not limited to, (i) an overmolding system, (ii) a method of an overmolding system, (iii) an article of manufacture for directing a data processing system to control a molding system, and (iv) an article manufactured by an overmolding system.

BACKGROUND

WO Patent 2004/011315 (Inventor: Staargaard et al; Assignee: General Electric Company, USA), WO Patent 2004/056610 (Inventor: Staargaard; Assignee: General Electric Company, USA) and US Patent Application 2003/0077409 (Inventor: Schnell) all appear to disclose a process and system for inserting a hydro-formed metal insert into a mold of a molding machine, and then partially encapsulating or overmolding the formed insert with a molding material (such as a plastic resin). This approach includes using different types of machines, one type for forming and another type for molding.

EP Patent 826,476 (Inventor: Buchholz; Assignee: Tecumseh Products Company, USA) appears to disclose loading and forming an insert (that is, a tube) in a single mold of a molding system, and then encapsulating or overmolding the insert with a molding material (such as a plastic resin). This approach includes performing the forming operation and the overmolding operation in the single mold.

An article titled Secondary Operations: Unique System Uses Press Motion As Punch and Die (published by Plastics World in September 1992, page 10) discloses a molding system having a mold. With the mold opened, a press operator loads a metal insert (that is a metal buss bar) into the mold. As a press closes and clamps, a punch and die mechanism pierces a slug in the insert, and then a nylon-based molding material is injected into the mold to overmold the insert. The forming operation and the overmolding operation are performed sequentially in the same mold.

A document (dated October 1989, titled ALPHA—Multiprocessing Technology and published by Krauss Maffei of Germany), discloses the ALPHA molding system that appears to be an integration of several types of molding systems (such as, for example, a compression molding system, an injection molding system and/or a gas-pressure molding system). This arrangement appears to combine different molding materials into a molded article using different processes.

U.S. Pat. No. 6,837,697 (Inventor: Lees et al; Publication: 2005-01-04) discloses a carton-packaging machine that forms a carton, and a polymer-injection system that injects a polymer and molds a closure to the carton.

SUMMARY

According to a first aspect of the present invention, there is provided a system, including, amongst other things: (i) an insert-forming station having a collection of mold halves configured to only form an insert; (ii) an overmolding station having a group of mold halves configured to only overmold the insert that was formed by the insert-forming station; and (iii) a mold-moving assembly configured to move the insert between the insert-forming station and the overmolding station.

According to a second aspect of the present invention, there is provided a system, including, amongst other things: a mold-moving assembly configured to: (i) cooperate with an insert-forming station having a collection of mold halves configured to only form an insert, (ii) cooperate with an overmolding station having a group of mold halves configured to only overmold the insert that was formed by the insert-forming station, and (iii) move the insert between the insert-forming station and the overmolding station.

According to a third aspect of the present invention, there is provided a system, including, amongst other things: an insert-forming station having a collection of mold halves configured to only form an insert, the insert-forming station configured to cooperate with a mold-moving assembly, the mold-moving assembly configured to: (i) cooperate with an overmolding station having a group of mold halves configured to only overmold the insert that was formed by the insert-forming station, and (ii) move the insert between the insert-forming station and the overmolding station.

According to a fourth aspect of the present invention, there is provided a system, including, amongst other things: a mold half of a collection of mold halves of an insert-forming station, the insert-forming station configured to cooperate with a mold-moving assembly, the mold-moving assembly configured to (i) cooperate with an overmolding station having a group of mold halves configured to only overmold the insert that was formed by the insert-forming station, and (ii) move the insert between the insert-forming station and the overmolding station.

According to a fifth aspect of the present invention, there is provided a system, including, amongst other things: an overmolding station having a group of mold halves configured to only overmold an insert that was formed by an insert-forming station, the overmolding station configured to cooperate with a mold-moving assembly, the mold-moving assembly configured to: (i) cooperate with an insert-forming station having a collection of mold halves configured to only form an insert, and (ii) move the insert between the insert-forming station and the overmolding station.

According to a sixth aspect of the present invention, there is provided a system, including, amongst other things: a group of mold halves of an overmolding station, the group of mold halves configured to only overmold an insert that was formed by an insert-forming station, the overmolding station configured to cooperate with a mold-moving assembly, the mold-moving assembly configured to: (i) cooperate with an insert-forming station having a collection of mold halves configured to only form an insert, and (ii) move the insert between the insert-forming station and the overmolding station.

According to a seventh aspect of the present invention, there is provided a method, including, amongst other things: configuring a mold-moving assembly to: (i) cooperate with an insert-forming station having a collection of mold halves configured to only form an insert, (ii) cooperate with an overmolding station having a group of mold halves configured to only overmold the insert that was formed by the insert-forming station, and (iii) move the insert between the insert-forming station and the overmolding station.

According to a eighth aspect of the present invention, there is provided an article of manufacture for directing a data processing system to control a molding system operatively connectable to the data processing system, the article of manufacture including, amongst other things: a data processing system usable medium embodying one or more instructions executable by the data processing system, the one or more instructions including instructions for directing the data processing system to direct a mold-moving assembly to:

cooperate with an insert-forming station having a collection of mold halves configured to only form an insert, (ii) cooperate with an overmolding station having a group of mold halves configured to only overmold the insert that was formed by the insert-forming station, and (iii) move the insert between the insert-forming station and the overmolding station.

According to a ninth aspect of the present invention, there is provided an article manufactured by the system of any one of the systems described above.

A technical effect of the present invention is an improved approach for molding articles.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

FIGS. 1A to 1F are side elevation views of a system 100 according to the first exemplary embodiment. The elements or components of the system 100 may be supplied by: (i) different vendors or (ii) a single vendor (such as a systems integrator).

Figure 1A:
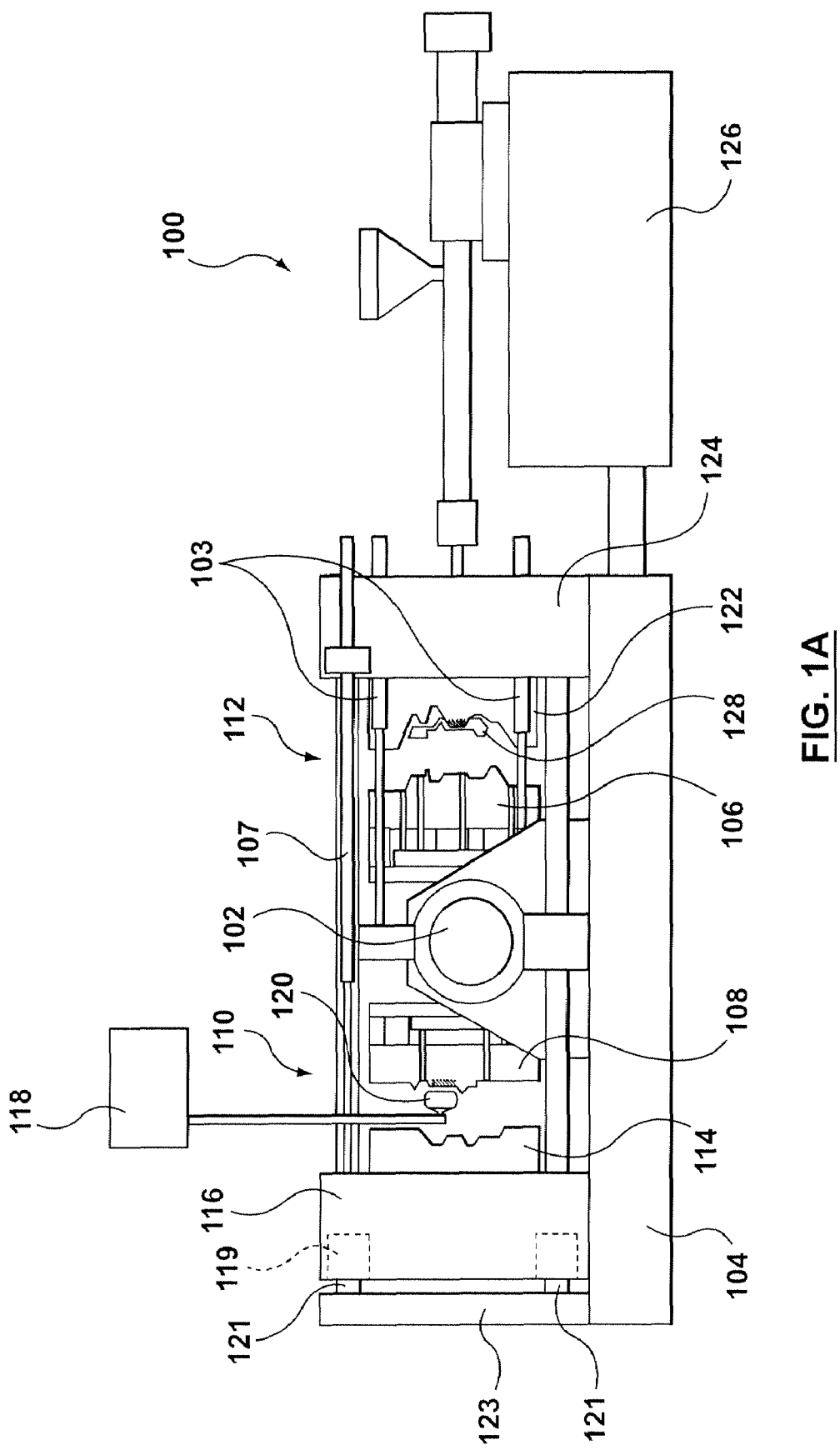
FIGS. 1A to 1F are side elevation views of a system according to a first exemplary embodiment of the present invention (which is the preferred embodiment)

FIG. 1A depicts a first phase of an operation cycle of the system 100. The system 100 includes a mold-moving assembly 102 that is configured to: (i) cooperate with an insert-forming station 110, (ii) cooperate with an overmolding station 112, and (iii) move an insert between the insert-forming station 110 and the overmolding station 112. The insert-forming station 110 has a collection of mold halves (108, 114) that are configured to only form an insert 120. The overmolding station 112 has a group of mold halves (106, 122) that are configured to only overmold the insert (120) that was formed by the insert-forming station 110. Operation of the insert-forming station 110 and operation of the overmolding station 112, preferably, overlap one another at least in part to reduce cycle time.

Actuators 103 are used to stroke the mold-moving assembly 102 along a base 104 so as to move the mold halves (106, 108) between the insert-forming station 110 and the overmolding station 112. The mold-moving assembly 102 uses rotation actuators (not depicted) for rotating the mold halves (106, 108) about a rotation axis. The mold-moving assembly 102 has rotated: (i) the mold half 106 to face the overmolding station 112 and (ii) the mold half 108 to face the insert-forming station 110. The mold halves 106, 108 use mechanisms (not depicted but are described below) to retain an insert and/or an overmolded article while the mold halves 106, 108 are rotated or moved between the stations 110, 112.

The insert-forming station 110 uses (includes) a collection of mold halves (108, 114) that includes: (i) the mold half 108 and (ii) a mold half 114. The collection of mold halves (108, 114) is used in a process for forming an insert 120. The mold half 114 is attached to a movable platen 116. An actuator 107 will be used to stroke the platen 116 along the base 104 toward and away from the mold-moving assembly 102 so that the combination of mold halves (108, 114) may be opened and closed. The actuator 107 does not necessarily have to be actuated so as to close the combination of mold halves (106, 114) relative to each other (the reason for will be apparent from the description below).

Figure 1B:
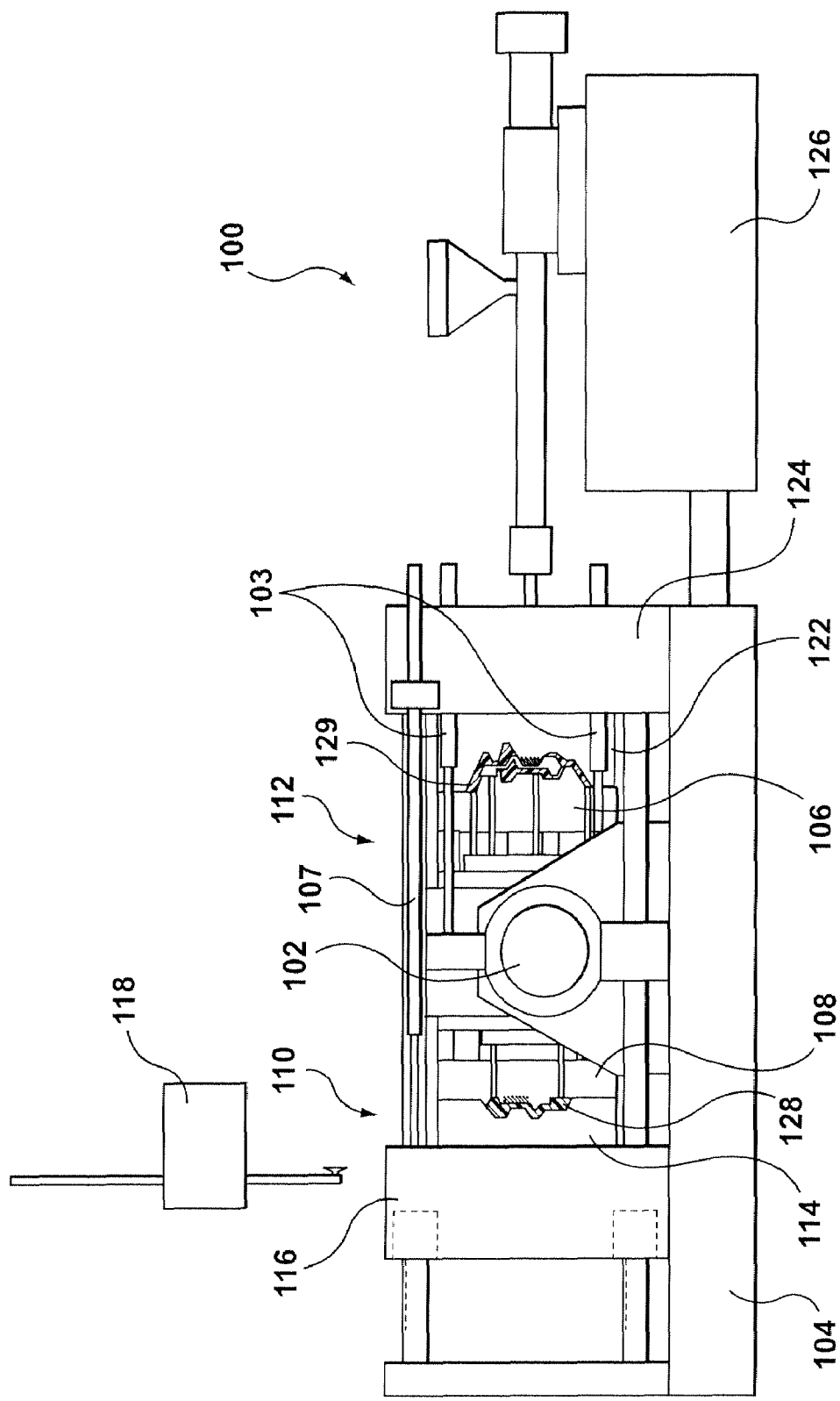

An insert-delivery assembly 118 is used to deliver and place the insert 120 proximate to the mold half 108. Once the insert-delivery assembly 118 positions the insert 120 proximate to the mold half 108, the mold half 108 will be actuated (by mechanisms not depicted) to retain the insert 120 while the assembly 118 will be actuated to release the insert 120. For example, the insert 120 may be releasably retained by the mold half 108 by using an electromagnet if the insert 120 includes a metallic component. Other gripping mechanisms for gripping the insert 120 may be used such as a vacuum line or a mechanical gripper, etc. The actuator 107 will be actuated to stroke the platen 116 toward the mold-moving assembly 102 so that the mold half 114 will become closed against the mold half 108. Once the mold halves 108, 114 are closed together, a clamping mechanism 119 (which is located in the movable platen 116) will be actuated to apply a clamping force to tie bars 121 (that extend from a stationary platen 124 through the movable platen 116 and over to a tie-bar support structure 123). The support structure 123 is used to prevent the tie bars 121 from sagging. The support structure 123 is optional (if the tie bars 121 are not sufficiently strong enough). In effect, the tie bars 121 will transfer the clamping force from the clamping mechanism 119 over to the mold halves 108, 114 that were closed against each another. The mold halves 114, 108 (once closed and clamped up) will be used in the process for deforming or forming the insert 120. According to a variant, the insert 120 includes a hollow metallic component or body, and a hydro-forming process (described below in detail) is used to form the insert 120 by introducing a hydro-forming fluid into an interior cavity of the insert 120. Other forming processes are possible (and described below). Once the insert 120 has been formed, the clamping mechanism 119 will be actuated to: (i) remove the clamping force and (ii) apply a mold break force via the tie bars 121 to break apart the mold halves 108, 114. Once the mold halves 108, 114 are broken apart, the actuator 107 will be actuated to stroke the platen 116 away from the mold-moving assembly 102 so that the mold halves 108, 114 may be spaced apart from one another while the mold half 108 continues to retain the formed insert 128. Once the mold halves 108, 114 are spaced apart from each other, the rotation actuators of the mold-moving assembly 102 will be actuated to rotate the mold half 108 (along with the formed insert 128) over to the overmolding station 112, and also will be actuated to rotate the mold half 106 into the insert-forming station 110. It is described below that the mold half 106 will be used to move a composite article 129 (which is depicted in FIG. 1B) into the station 110 so that the insert-delivery assembly 118 may then be actuated to remove the composite article 129 from the station 110. The composite article 129 includes a formed insert 128 that is overmolded with a molding material.

The overmolding station 112 uses a group of mold halves (106, 108, 122). The group of mold halves (106, 108, 122) includes: (i) the mold half 106, (ii) the mold half 108 and (iii) a mold half 122. The mold halves (106, 108) shares at least one mold half that is common with the group of mold halves (106, 108, 122). The combination of mold halves (106, 122) will be used to overmold inserts that were formed in the insert-forming station 110. During other phases of the cycle of the system 100, the mold half 108 will be used to: (i) deliver a formed insert to the station 112, and (ii) pass off the formed insert to the mold half 122; then, the mold half 108 will be rotated back to the station 110 while the mold half 106 will be rotated back into the station 112. As depicted in FIG. 1A, the mold half 122 is shown retaining the formed insert 128 which was received from the mold half 108 (but FIG. 1A shows the mold half 108 rotated back to the station 110).

An injection unit 126 is used to prepare and to inject a molding material into a mold cavity that will be defined by the combination of mold halves (106, 122). The insert 128 was formed in the station 110 and is shown in FIG. 1A retained by the mold half 122. The actuators 103 will be actuated to stroke the mold-moving assembly 102 toward the mold half 122 so that the mold halves 106, 122 will be made to close against each other. Once the mold halves 106, 122 are closed, the clamp assembly 119 will be actuated to apply the clamping force to the mold halves 106, 114 (via the tie bars 121); then, the injection unit 126 will be actuated to inject the molding material to overmold the insert 128 to manufacture the composite article 129. Once the article 129 has been manufactured, the clamping assembly 119 will be actuated to: (i) remove the clamping force and (ii) apply the mold-break force to the mold halves 106, 122 to break apart the mold halves 106, 122. Once the mold halves 106, 122 are broken apart, the actuators 103 will be actuated to stroke the mold-moving assembly 102 away from the mold half 122 so that the composite article 129 may then be moved from the station 112 to the station 110 (for subsequent removal by the insert-delivery assembly 118, or—alternatively—the article 129 may then be removed from the station 112 by the insert-delivery assembly 118).

FIG. 1B shows a second phase of the operation cycle of the system 100. The actuators 103 were actuated to stroke the mold-moving assembly 102 toward the mold half 122 so that the mold half 106 is closed against the mold half 122. The actuator 107 was actuated to stroke the movable platen 116 toward the mold-moving assembly 102 so that the mold half 114 is closed against the mold half 108. The clamping mechanism 119 is actuated to apply the clamping force to the mold halves 106, 122 and to the mold halves 108, 114. Then, the injection unit 126 is actuated to inject a molding material into the cavity that is formed by the mold halves 106, 122 to overmold the insert 128 to manufacture the composite article 129 with the molding material; the insert-forming station 110 is actuated to form the insert 120 (to form the formed insert 128). Preferably, a hydro-forming process is used if the insert 120 includes a hollow metallic body. Other types of insert-forming processes may be used for forming the insert 120 (for example, by closing the mold halves 108, 114 the insert 120 is crimped at least in part by the mold halves 108, 114).

Figure 1C:
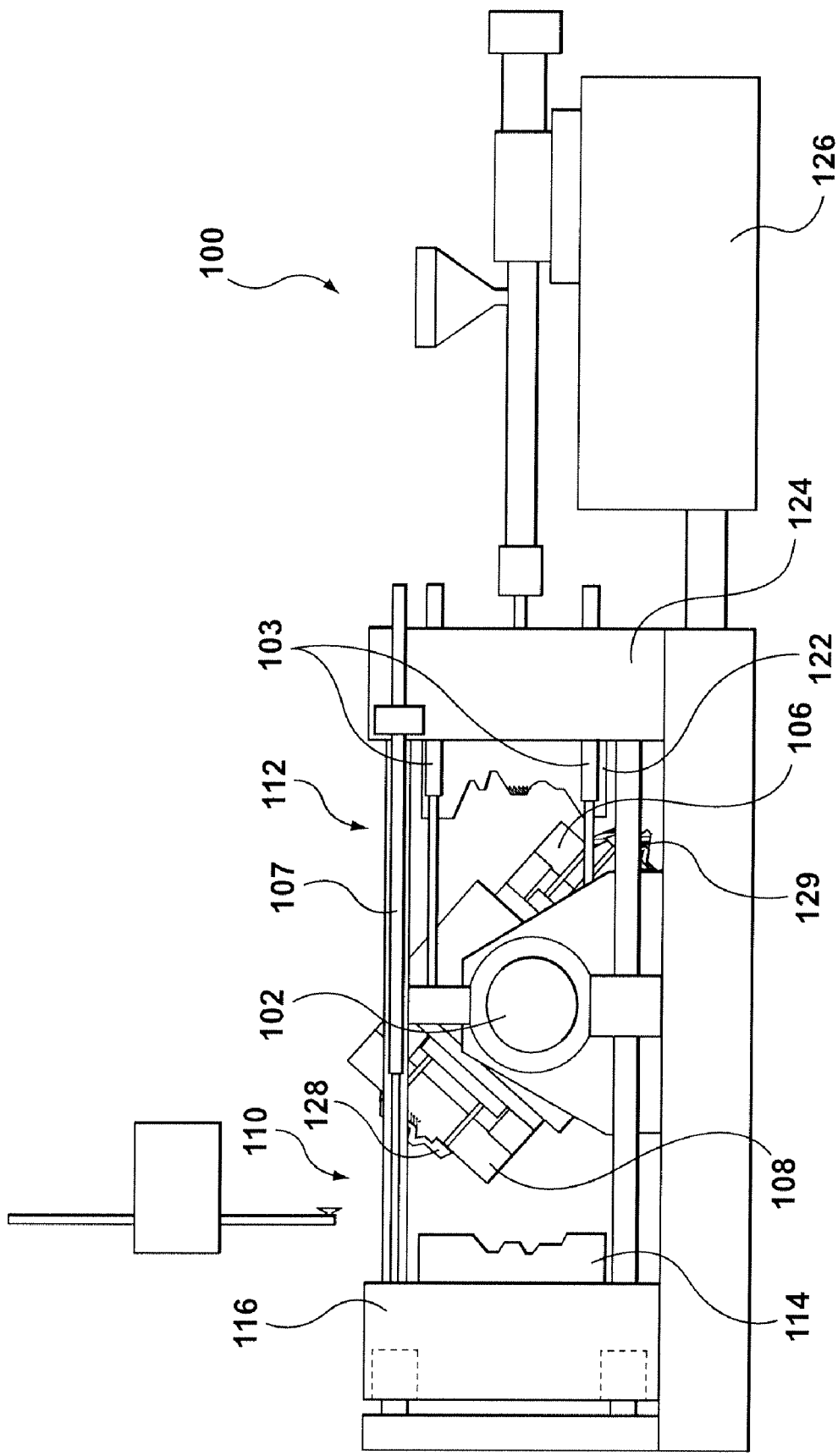

FIG. 1C shows a third phase of the operation cycle of the system 100. The clamping mechanism 119 was actuated to: (i) remove the clamping force, and (ii) apply the mold-break force (via the tie bars 121) to break apart the mold halves (106, 122) and mold halves (108, 114). Once the mold halves were broken apart, the actuator 107 was actuated to stroke the movable platen 116 away from the mold-moving assembly 102 so that the mold half 114 became spaced apart from the mold half 108; then, the actuators 103 were actuated to stroke the mold-moving assembly 102 away from the mold half 122 (to separate the mold half 106 from the mold half 122). The rotation actuators of the mold-moving assembly 102 are actuated to rotate the mold-moving assembly 102 so that: (i) the mold half 108 (along with the formed insert 128) is shown rotating from the insert-forming station 110 over to the overmolding station 112, and (ii) the mold half 106 (and the composite article 129) is shown rotating from the overmolding station 112 over to the insert-forming station 110.

Figure 1D:
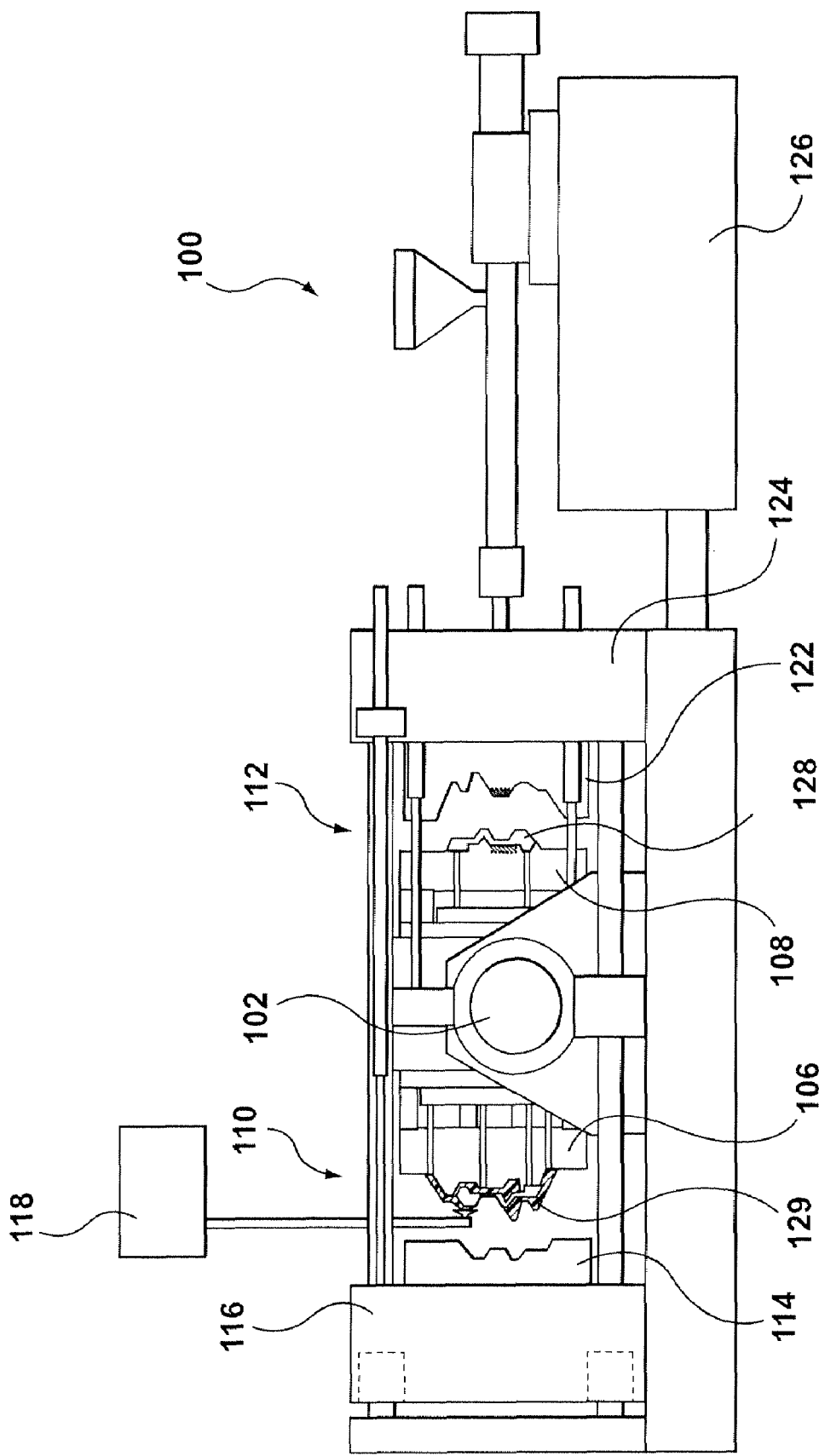

FIG. 1D shows a fourth phase of the operation cycle of the system 100. The composite article 129 is shown positioned by the mold half 106 in the station 110. The insert-delivery assembly 118 is actuated to reach into the insert-forming station 110 and to grab the composite article 129. Once the article 129 is grabbed, the assembly 118 will be actuated to release the composite article 129 from the station 110. The mold half 108 retains the formed insert 128 in the overmolding station 112.

Figure 1E:
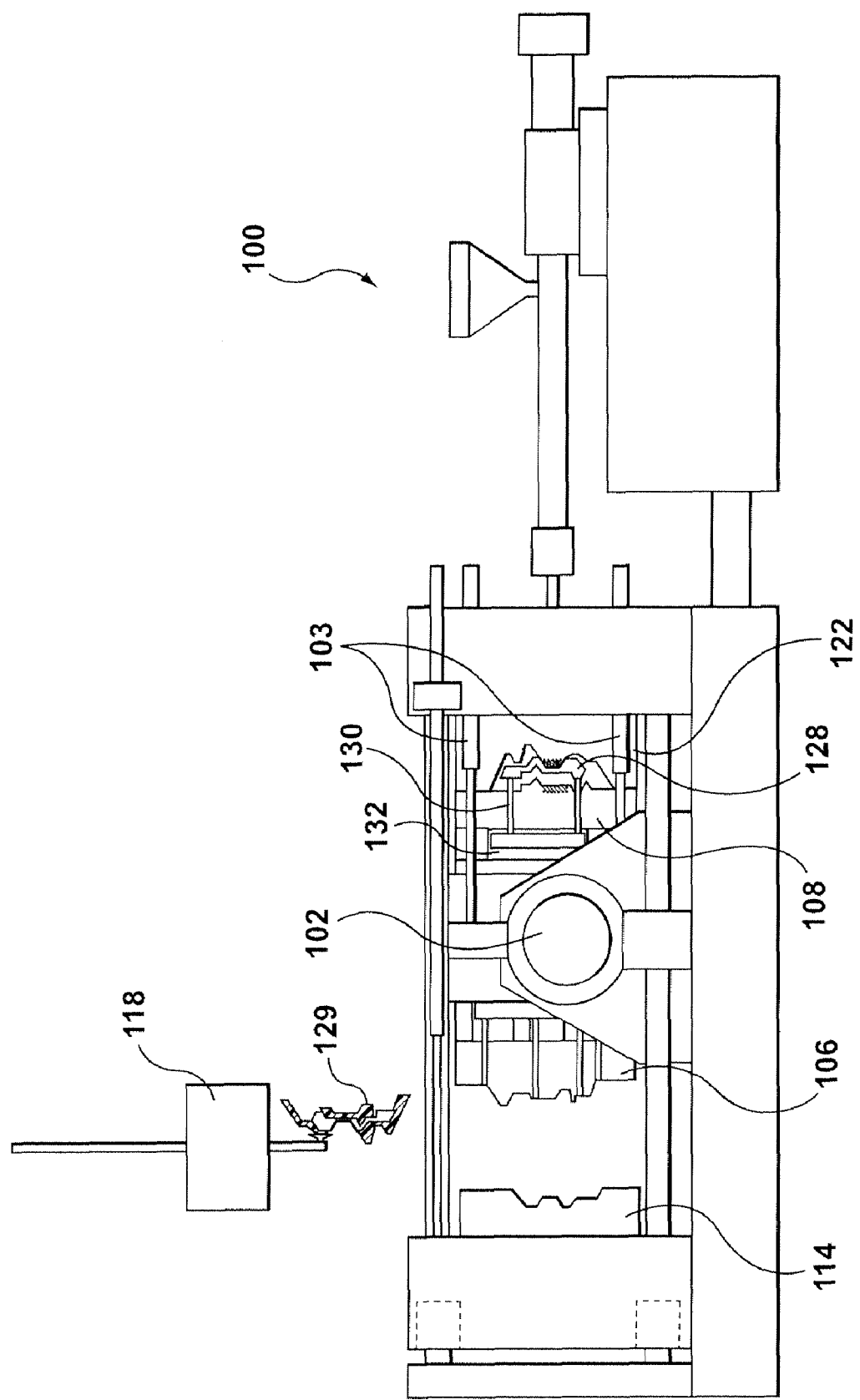

FIG. 1E shows a fifth phase of the operation cycle of the system 100. The actuators 103 were actuated to stroke the mold-moving assembly 102 toward the mold half 122 so that the insert 128 was positioned proximate to the mold half 108. Then, the mold half 122 was actuated to grab and to retain the formed insert 128 while the mold half 108 was de-actuated to release the formed insert 128, so that (in effect) the formed insert 128 is now shown transferred from the mold half 108 over to the mold half 122.

Figure 1F:
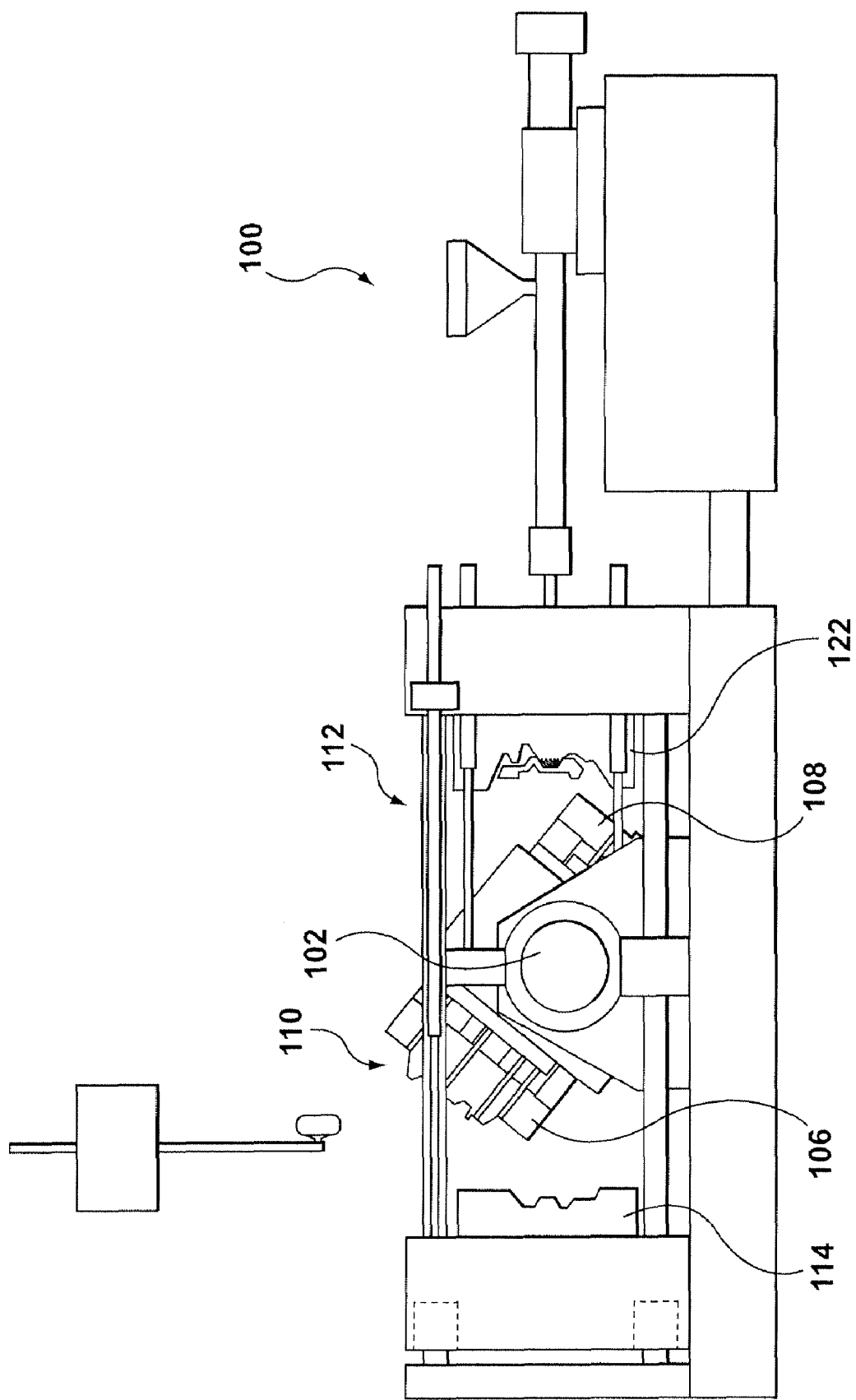

FIG. 1F shows a sixth phase of the operation cycle of the system 100. The rotation actuators of the mold-moving assembly 102 are shown actuating to rotate the mold-moving assembly 102 so that: (i) the mold half 108 is rotating away from the overmolding station 112 and over to the insert-forming station 110, and (ii) the mold half 106 is rotating away from the insert-forming station 110 over to the overmolding station 112. The cycle of the system 100 may now be repeated.

Figure 2:
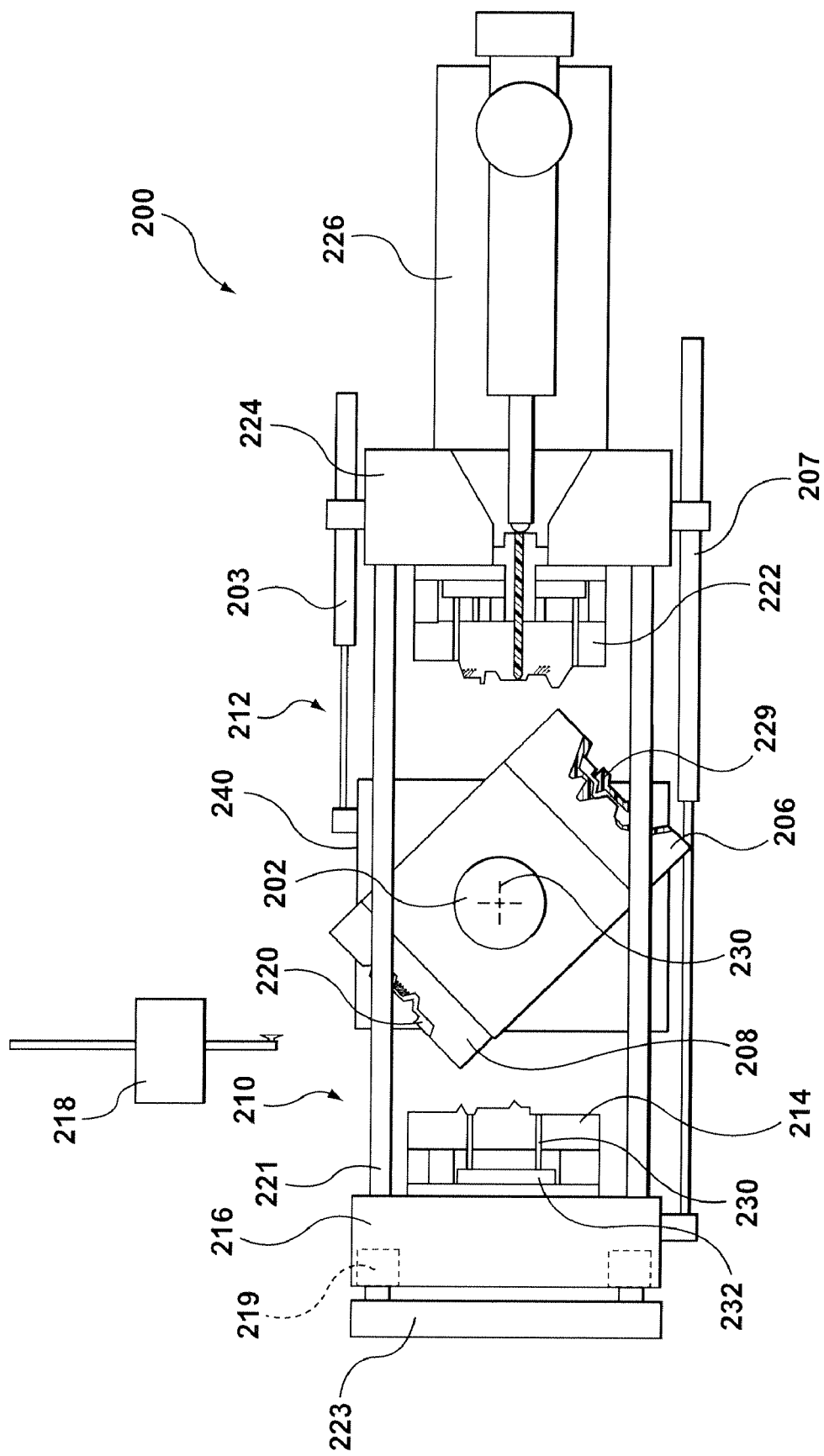
FIG. 2 is a top view of a system according to a second exemplary embodiment.

FIG. 2 is a top view of a system 200 according to the second exemplary embodiment. The elements or components of the system 200 may be supplied by different vendors in different combinations and permutations or may be supplied by a single vendor. To facilitate an understanding of the second exemplary embodiment, elements of the second exemplary embodiment (that are similar to those of the first exemplary embodiment) are identified by reference numerals that use a two-hundred designation rather than a one-hundred designation (as used in the first exemplary embodiment). For example, the mold-moving assembly 202 of the second exemplary embodiment is labeled 202 rather than being labeled 102. A difference between the system 100 and the system 200 is that the mold-moving assembly 202 rotates about an axis that extends vertically while the mold-moving assembly 102 translates along an axis that extends horizontally.

According to the second exemplary embodiment, the disadvantage of the weight of an article-ejection mechanism used in the mold halves 106, 108 and carried by the mold-moving assembly 102 along with injection gating into a cavity half of the overmolding station 112 may be overcome (in the second exemplary embodiment) by reversing the core and cavity halves of mold halves 206, 222 of the molding station 212 thereby installing cavity halves (206, 208) on the mold-moving assembly 202. This arrangement removes the weight disadvantage associated with the first exemplary embodiment, and injection gating of an article 229 may now be provided on the core side of the mold half 222.

Figure 3:
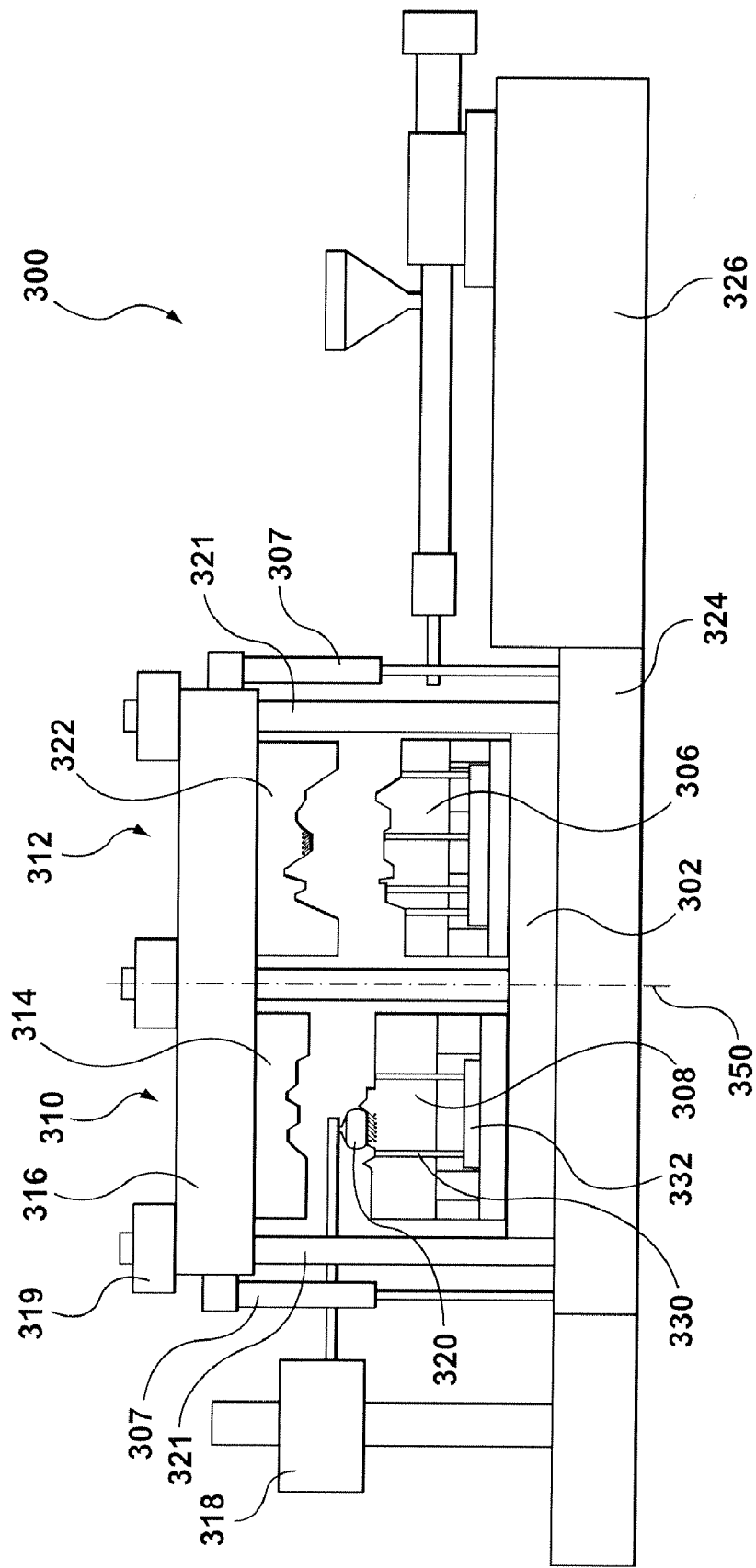
FIG. 3 is a side elevation view of a system according to a third exemplary embodiment.

FIG. 3 is a side elevation view of a system 300 according to the third exemplary embodiment. The elements or components of the system 300 may be supplied by different vendors in different combinations and permutations or may be supplied by a single vendor. To facilitate an understanding of the third exemplary embodiment, elements of the third exemplary embodiment (that are similar to those of the first exemplary embodiment) are identified by reference numerals that use a three-hundred designation rather than a one-hundred designation (as used in the first exemplary embodiment). For example, the mold-moving assembly 302 of the third exemplary embodiment is labeled 302 rather than being labeled 102. A difference between the system 100 and the system 300 is that the mold-moving assembly 302 is a rotatable table that is actuated to rotate about an axis 350 that extends vertically, and the mold halves translate vertically rather than horizontally.

Figure 4:
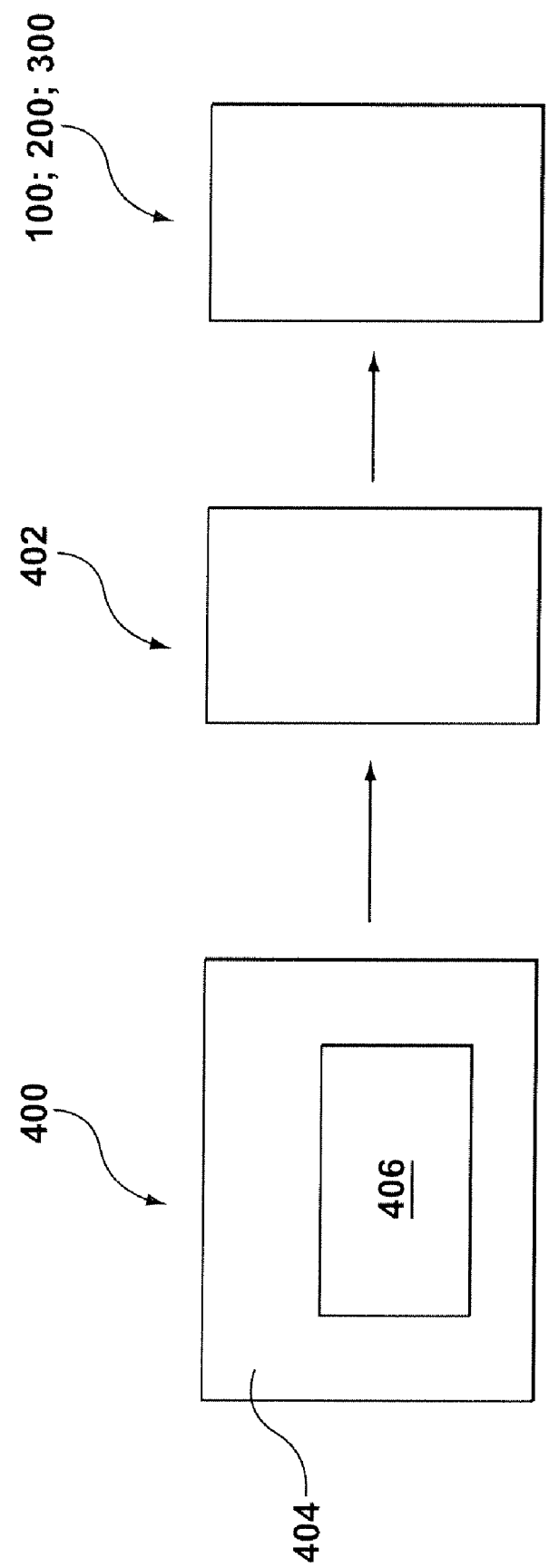
FIG. 4 is a block schematic diagram of an article of manufacture according to a fourth exemplary embodiment, in which the article is for directing a data processing system to control the systems 100, 200, 300 of FIGS. 1A, 2, 3 respectively.

FIG. 4 is a block schematic diagram of an article of manufacture 400 according to the fourth exemplary embodiment, in which the article 400 is for directing a data processing system 402 to control the systems 100, 200, 300 of FIGS. 1A, 2, 3 respectively. The system 100, 200, 300 is operatively connectable to the data processing system 402. The article of manufacture 400 includes a data processing system usable medium 404 embodying one or more instructions 406 executable by the data processing system 402. The one or more instructions 406 include:

(i) instructions for directing the data processing system to direct a mold-moving assembly (102; 202; 302) to: cooperate with an insert-forming station (110; 210; 310) to form an insert, cooperate with an overmolding station (112; 212; 312) to overmold a formed insert that was formed in the insert-forming station (110; 210; 310), and move inserts between the insert-forming station (110; 210; 310) and the overmolding station (112; 212; 312), (ii) instructions for directing the data processing system to direct a group of mold halves (106; 108; 122; 206, 208, 222; 306; 308; 322) to move at least one insert between selected mold halves of group of mold halves (106; 108; 122; 206, 208, 222; 306; 308; 322), the group of mold halves (106; 108; 122; 206, 208, 222; 306; 308; 322) include in the overmolding station (112; 212; 312), and (iii) instructions for directing the data processing system to direct operation of the insert-forming station (110; 210; 310) and operation of the overmolding station (112; 212; 312) to overlap one another at least in part to reduce cycle time.

The article of manufacture 400 may be a magnetic disk, an optical disk, a hard drive or RAM (Random Access Memory). The article of manufacture 400 may also be a signal that carries the one or more instructions 406 over a network, such as the Internet, to the data processing system 402.

The one or more instructions 406 also include, but are not limited to, the following (in no particular order):

instructions for directing the data processing system to direct the insert-forming station 110, 210, 310 to form the insert 120, 220, 320 at least in part;

instructions for directing the data processing system to direct the overmolding station 112, 212, 312 to encapsulate a molding material onto the insert 120, 220, 320 at least in part;

instructions for directing the data processing system to direct the mold-moving assembly 102, 202, 302 to move mold halves 106, 108, 206, 208, 306, 308 between the insert-forming station 110, 210, 310 and the overmolding station 112, 212, 312;

instructions for directing the data processing system to direct the insert-forming station 110, 210, 310 to form the insert 120, 220, 320 at least in part, the insert-forming station 110, 210, 310 cooperating with the mold halves 106, 108, 206, 308, 306, 308;

instructions for directing the data processing system to direct the insert-forming station 110, 210, 310 to form the insert 120, 220, 320 at least in part, the insert-forming station 110, 210, 310 includes a group of mold halves 106, 108, 114, 206, 208, 214, 306, 308, 314 configured to cooperate with the mold halves 106, 108, 206, 308, 306, 308;

instructions for directing the data processing system to direct the overmolding station 112, 212, 312 to encapsulate a molding material relative to the insert 120, 220, 320 at least in part, the mold halves 106, 108, 206, 308, 306, 308 cooperating with the overmolding station 112, 212, 312;

instructions for directing the data processing system to direct the overmolding station 112, 212, 312 to overmold a molding material relative to the insert 120, 220, 320 at least in part, the overmolding station 112, 212, 312 includes a collection of mold halves 106, 108, 122, 206, 208, 222, 306, 308, 322 configured to cooperate with the mold halves 106, 108, 206, 308, 306, 308;

instructions for directing the data processing system to direct the mold-moving assembly 102, 202, 302 to rotate a mold halves 106, 108, 206, 308, 306, 308 between the insert-forming station 110, 210, 310 and the overmolding station 112, 212, 312;

instructions for directing the data processing system to direct the mold-moving assembly 102, 202, 302 to linearly translate the mold halves 106, 108, 206, 308, 306, 308 between the insert-forming station 110, 210, 310 and the overmolding station 112, 212, 312;

instructions for directing the data processing system to direct a retaining structure of the mold halves 106, 108, 206, 308, 306, 308 to releasably retain the insert 120, 220, 320;

instructions for directing the data processing system to direct the insert-forming station 110, 210, 310 to hydroform a metallic component of the insert 120, 220, 320 at least in part;

instructions for directing the data processing system to direct the mold-moving assembly 102 to rotate the mold halves 106, 108 about a first horizontally-aligned axis 130), the molds of the mold halves 106, 108 are clampable along a second horizontally-aligned axis);

instructions for directing the data processing system to direct the mold-moving assembly 202 to rotate the mold halves 206, 208 about a vertically-aligned axis 230), the molds of the mold halves 206, 208 are clampable along a horizontally-aligned axis 232); and instructions for directing the data processing system to direct the mold-moving assembly 302 to rotate the mold halves 306, 308 about vertically-aligned axis 330), the mold halves of the mold halves 306, 308 are clampable along respective vertically-aligned axes).

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A system, comprising:

an insert-forming station having a collection of mold halves being configured to only form an insert;

an overmolding station having a group of mold halves being configured to only overmold the insert formed by the insert-forming station and thereby form an overmolded insert;

a mold-moving assembly being configured to: (i) cooperate with the insert-forming station, (ii) cooperate with the overmolding station, (iii) move the insert from the insert-forming station to the overmolding station, and (iv) move the overmolded insert from the overmolding station to the insert-forming station;

the collection of mold halves being used to form the insert, while the group of mold halves being configured to overmold the insert formed by the insert-forming station, the mold halves of the group of mold halves in the insert-forming station being configured to form the insert during a first operation;

the group of mold halves in the overmolding station being configured to overmold the overmolded insert during the first operation;

the mold-moving assembly being configured to move the insert and one of the mold halves of the collection of mold halves from the insert-forming station to the overmolding station during a second operation;

the mold-moving assembly being configured to move the overmolded insert and one of the mold halves of the group of mold halves from the overmolding station to the insert-forming station during the second operation;

the insert-forming station being configured to remove the overmolded insert from the one of the mold halves of the group of mold halves during a third operation;

the overmolding station being configured to transfer the insert from the one of the mold halves of the collection of mold halves to another one of the mold halves of the group of mold halves during the third operation;

the mold-moving assembly being configured to move the one of the mold halves of the collection of mold halves from the overmolding station to the insert-forming station during a fourth operation; and the mold-moving assembly being configured to move the one of the mold halves of the group of mold halves from the insert-forming station to the overmolding station during the fourth operation.

2. The system of claim 1, wherein:

the overmolding station is configured to cooperate with a stationary platen, and at least one of the mold halves of the group of mold halves is mountable to the stationary platen;

the insert-forming station is configured to cooperate with a movable platen being movable relative to the stationary platen, and at least one of the molds of the collection of mold halves is mountable to the movable platen; and the mold-moving assembly is configured to be movable between the stationary platen and the movable platen.

3. The system of claim 1, wherein:

the mold-moving assembly is further configured to support at least one of the collection of mold halves and at least one of the group of mold halves.

4. The system of claim 1, wherein:

operation of the insert-forming station and operation of the overmolding station overlap one another at least in part to reduce cycle time.

5. The system of claim 1, wherein:

the insert-forming station is configured to form the insert at least in part, and wherein the overmolding station is configured to encapsulate a molding material onto the insert at least in part.

6. The system of claim 1, wherein:

the mold-moving assembly is configured to at least any one of rotate and linearly translate the mold halves of the group of mold halves between the insert-forming station and the overmolding station.

7. A method of operating a system, the system including an insert-forming station having a collection of mold halves being configured to only form an insert, an overmolding station having a group of mold halves being configured to only overmold the insert formed by the insert-forming station and thereby form an overmolded insert, a mold-moving assembly being configured to: (i) cooperate with the insert-forming station, (ii) cooperate with the overmolding station, (iii) move the insert from the insert-forming station to the overmolding station, and (iv) move the overmolded insert from the overmolding station to the insert-forming station, the method comprising:

using the collection of mold halves being to form the insert, while the group of mold halves overmold the insert formed by the insert-forming station, using the mold halves of the group of mold halves in the insert-forming station to form the insert during a first operation;

using the group of mold halves in the overmolding station overmold the overmolded insert during the first operation;

using the mold-moving assembly to move the insert and one of the mold halves of the collection of mold halves from the insert-forming station to the overmolding station during a second operation;

using the mold-moving assembly to move the overmolded insert and one of the mold halves of the group of mold halves from the overmolding station to the insert-forming station during the second operation;

using the insert-forming station to remove the overmolded insert from the one of the mold halves of the group of mold halves during a third operation;

using the overmolding station to transfer the insert from the one of the mold halves of the collection of mold halves to another one of the mold halves of the group of mold halves during the third operation;

using the mold-moving assembly to move the one of the mold halves of the collection of mold halves from the overmolding station to the insert-forming station during a fourth operation; and using the mold-moving assembly to move the one of the mold halves of the group of mold halves from the insert-forming station to the overmolding station during the fourth operation.

* * * * *